United States Patent [19]

Araseki et al.

[11] 4,012,603
[45] Mar. 15, 1977

[54] ECHO SUPPRESSOR HAVING SELF-ADAPTIVE MEANS

[75] Inventors: Takashi Araseki; Kazuo Ochiai, Tokyo, both of Japan

[73] Assignee: Nippon Electric Company, Ltd., Tokyo, Japan

[22] Filed: Aug. 22, 1975

[21] Appl. No.: 606,791

[30] Foreign Application Priority Data

Aug. 27, 1974 Japan .............................. 49-97533
Mar. 27, 1975 Japan .............................. 50-37277

[52] U.S. Cl. .......................... 179/170.6; 179/170.8
[51] Int. Cl.² ............................................ H04B 3/20
[58] Field of Search ......... 179/170.2, 170.6, 170.8, 179/1 HF, 1 SA

[56] References Cited

UNITED STATES PATENTS

| | | | |
|---|---|---|---|
| 3,560,669 | 2/1971 | Foulkes .......................... | 179/170.6 |
| 3,823,275 | 7/1974 | La Marche .................... | 179/170.6 |
| 3,896,273 | 7/1975 | Fariello ......................... | 179/170.6 |

OTHER PUBLICATIONS

IEEE Transactions on Communications, Dec. 1972, "A Digital Echo Suppressor for Satellite Circuits" by Fariello, pp. 1176–1181.

*Primary Examiner*—David L. Stewart
*Attorney, Agent, or Firm*—Ostrolenk, Faber, Gerb & Soffen

[57] ABSTRACT

An echo suppressor employed in systems interconnecting a two-wire circuit with a four-wire circuit for substantially eliminating "talker's echo" and for selectively attenuating the calling party's voice signal when the called party at the two-wire line begins speaking. The signal levels of signals on both paths of the four-wire circuit are measured to extract the maximum values of the signals for succeeding time intervals. The extracted value of the outgoing path signal is divided by the extracted value of the incoming path signal to generate an attenuation factor value. This value is multiplied by the value of the voice signal in the incoming path to generate an estimated leakage level signal. When this level is greater than the signal level in the output path (i.e. when there is no outgoing voice signal) the outgoing path is disconnected to prevent a talker's echo signal from being transmitted thereby. When the signal on the outgoing path is greater than the estimated leakage level signal the outgoing path is not disconnected, and an attenuation circuit in the incoming path is activated to attenuate signals in the incoming path. Delay means are provided to prevent the disconnection of the outgoing path at the initial and terminal ends of a voice signal.

15 Claims, 8 Drawing Figures

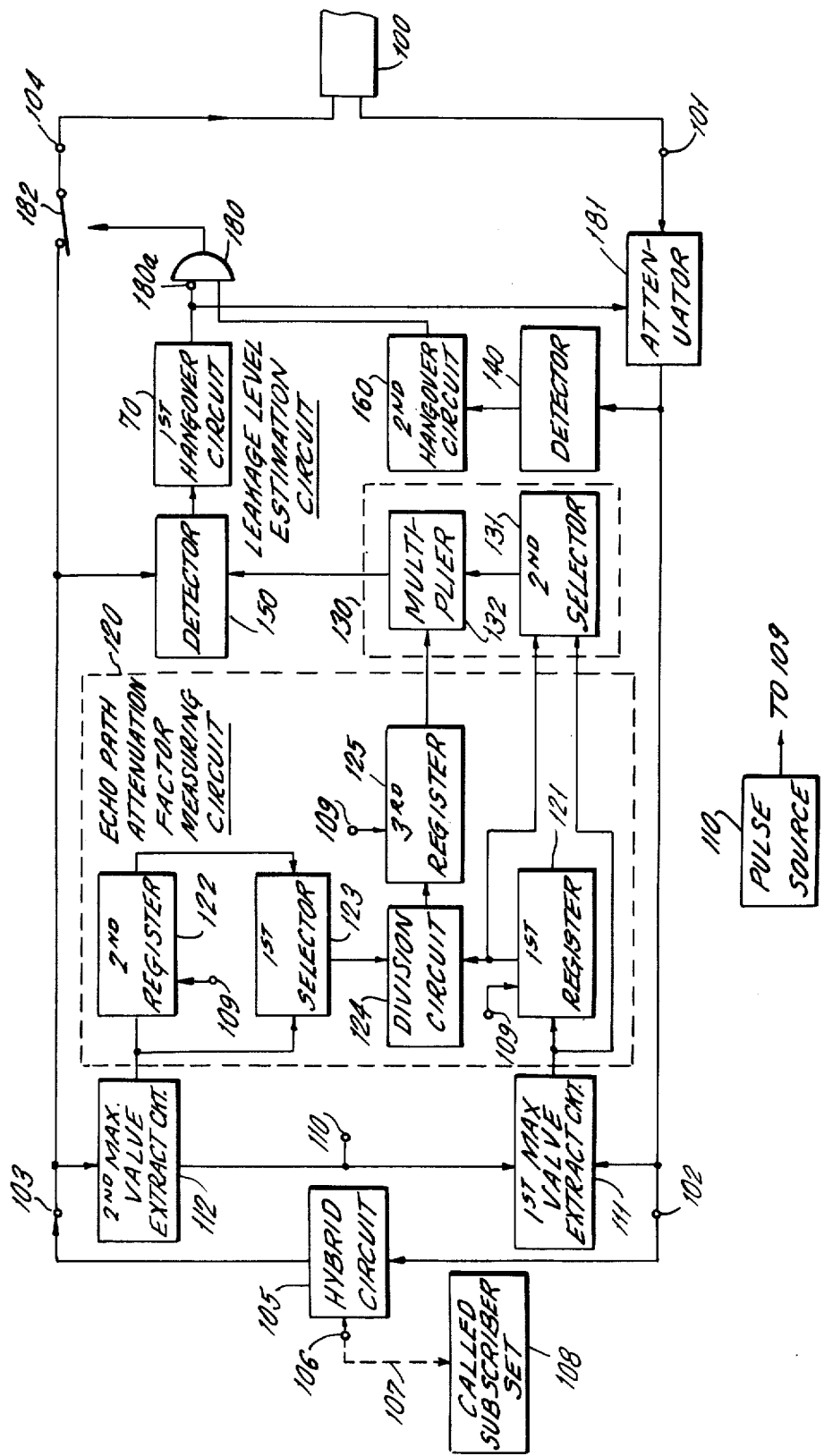

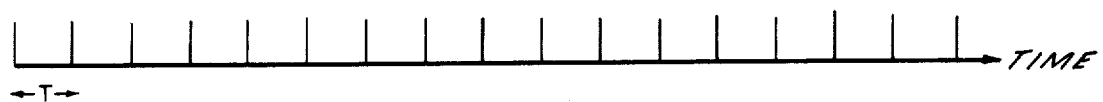
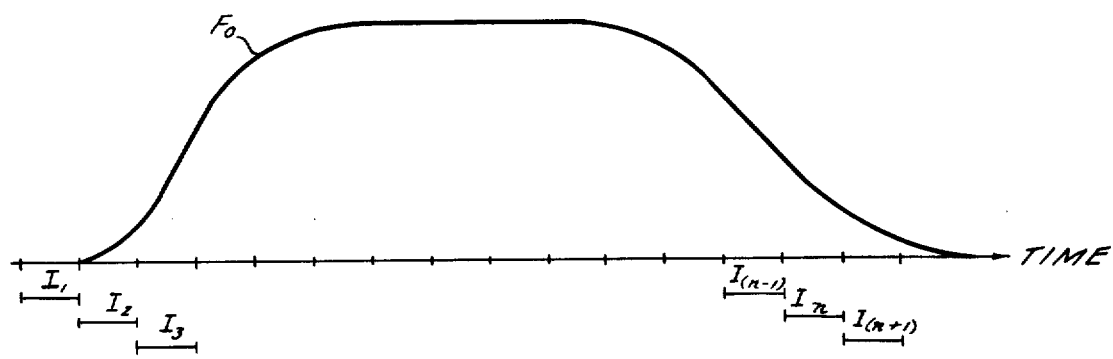
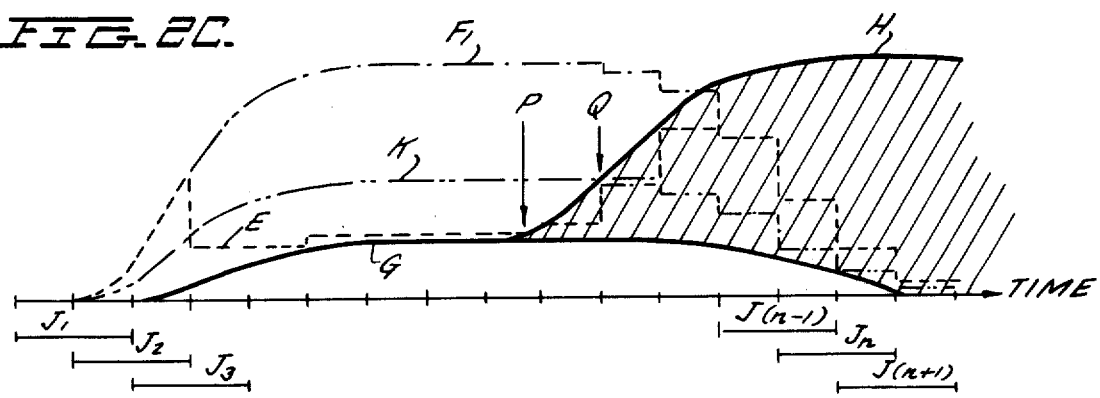

ECHO SUPPRESSOR HAVING SELF-ADAPTIVE MEANS

BACKGROUND OF THE INVENTION

Long-distance communication networks are typically comprised of a four-wire circuit wherein the carriers or subcarriers are respectively allotted to outgoing and incoming information signals. A local toll circuit normally connects the four-wire circuit, through terminal equipment, to a calling or called subscriber set which is comprised of the two-wire circuit. A four-wire terminating set (or four-wire to two-wire conversion device) must therefore be provided at the terminal equipment to suitably connect the two-wire and four-wire circuits. The conventional four-wire terminating set is comprised of a hybrid coil and an impedance balancing network for attaining impedance balance between the two and four-wire circuits. However, inasmuch as the impedance of the two-wire circuit varies by an appreciable amount as a function of the distance between the terminal equipment and the local subscriber set at the extremity of the two-wire circuit or according to the performance of telephone exchanges and transmission lines between the terminal equipment and the subscriber set, it can not be expected, as a practical matter, to attain impedance balance for any arbitrary subscriber sets.

For the convenience of explanation, it is assumed hereinafter that a calling subscriber at the remote end of the long-distance communication network calls a local subscriber on this side of the network. In the case where the above-mentioned impedance balance is attained, the information signal of the calling (remote) subscriber supplied through the communication network to the four-wire input terminal part of the above-mentioned hybrid coil passes without any ill effect through the hybrid coil and the two-wire circuit to the called (local) subscriber set. In the case where the impedance is not completely balanced, the information signal leaks through the hybrid coil to appear at the output terminal pair of the four-wire circuit thereof, and then is sent back to the calling subscriber, causing the phenomenon commonly referred to as talker's echo. Although the talker's echo produced in a comparatively short distance network does not cause much disturbance in the conversation, the echo produced in a long-distance communication network appreciably affects the quality and performance of the conversation, because the speech of the calling subscriber returns to the person speaking as the talker's echo after a transmission period of the order of several hundred milliseconds.

An echo suppressor conventionally used for suppressing or removing the talker's echo has a structure adapted to compare the outgoing signal level at the four-wire output terminal pair of the hybrid coil with a threshold level related to the incoming signal level. so that the outgoing signal circuit can be selectively disconnected to interrupt the outgoing signal level when the result of comparison shows that the outgoing signal level is not higher than the incoming signal level. The threshold level is given a value smaller than the incoming signal level by a prefixed rate. Statistics show that the distribution of echo attenuation factor of hybrids (being the main component for the attenuation in the echo path) throughout the United States has an average of 15 dB with a standard deviation of 3 dB. Therefore, the prefixed rate is selected about 6 dB, thereby to ensure that the threshold level is greater than the leakage (echo) level for most of hybrids (at a 99.7 -percent probability). An example of a conventional echo suppressor of the amplitude comparison type particularly adapted to time-division multiplex PCM information signals is described in detail in the technical report by E. Fariello entitled "A Digital Echo Suppressor for Satellite Circuits" published in the IEEE Transactions on Communications, December 1972. Therefore, further description will not be given here.

Generally, there are two mutually exclusive problems that one must deal with in an echo suppressor: reduction of voice clipping of the called subscriber's signal and reduction of echo of calling subscriber's signal. In the case of the conventional echo suppressor described above, the calling subscriber's signal is detected with the threshold level higher than the echo level by 9 dB on the average, so that the reduction of the echo is well attained but the malfunction attributed to the voice clipping appreciably reduces the conversation quality. Especially, the beginning part of a speech having relatively lower level than the remaining part is hardly detected until the level thereof reaches the threshold level set above the outgoing signal level in the state of no called subscriber's signal by 9 dB on the average, resulting in the interruption of the leading part of the speech called "initial clipping". Futhermore, if the attenuation in the echo path is poorer than 6 dB, the threshold level is needed to be adjusted more closely to the incoming signal level itself, bringing about a longer period of initial clipping. The initial clipping is inherent to the conventional echo suppressor of this type that detects the presence of the called subscriber's signal through the level comparison thereof with the threshold level which is not related to the attenuation factor of the echo path associated with the present echo suppressor.

BRIEF DESCRIPTION OF THE INVENTION AND OBJECTS

It is therefore an object of this invention to provide an echo suppressor which makes it possible to suppress or remove the talker's echo without being affected by the initial clipping.

Another object of the instant invention is to provide a novel electronic device for suppressing the talker's echo in a long-distance communication network, coupling a two-wire circuit at the end terminals of a four-wire circuit wherein means are provided for disconnecting the outgoing signal circuit of the four-wire circuit during the presence of the calling subscriber's signal, means for inhibiting the disconnection of the outgoing signal circuit in the presence of the called subscriber's signal detected by the comparison of the outgoing signal level with an estimated leakage (echo) component level.

In the present invention, the threshold level for the detection of the called subscriber's outgoing signal is given by the estimated leakage (echo) level generated as follows:

A level ratio between the outgoing signal level on the four-wire output terminal pair and incoming signal level on the four-wire input terminal pair is measured on a real time basis, and then multiplied with the incoming signal level to generate the product, i.e., the estimated leakage level. When the called subscriber's signal is not present, the level ratio indicates the real attenuation factor of the leakage (echo) path, and therefore the estimated leakage level is close to the real leakage level. To use the estimated leakage level as the threshold level, a certain delay is given to the attenuation-factor-representing signal, making it possible to avoid the initial clipping. In the presence of the called subscriber's signal, the measured level ratio tends to indicate greater value than the real attenuation factor. The ratio is set to be unity at most. It follows therefore that the sensitivity for the called subscriber's is equal, even in the worst condition, to that of the conventional echo suppressor, where the calling subscriber's signal level itself is used as the threshold level without any attenuation.

BRIEF DESCRIPTION OF THE FIGURES

These and other objects of the instant invention will become apparent when reading the accompanying description and drawings in which:

FIG. 1 shows a block diagram of an embodiment of the invention;

FIG. 2 comprised of 2A–2D shows a signal level diagram for the explanation of the embodiment shown in FIG. 1.

DETAILED DESCRIPTION OF THE INVENTION

Figure 3:
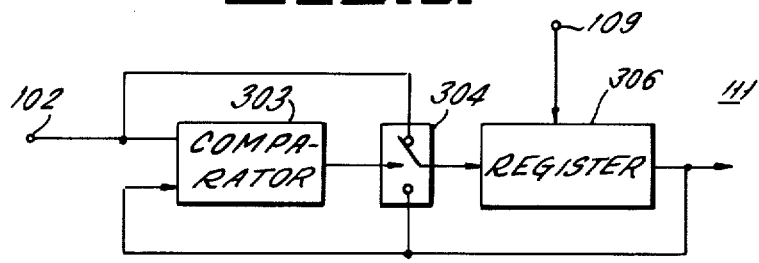
FIG. 3 shows a schematic diagram of a maximum value extraction circuit employed in the embodiment shown in FIG. 1.

In the echo suppressor (the circuit is adapted completely to digital information signals) of the invention shown in FIG. 1, the calling subscriber's signal, i.e., digitized voice signal, is transmitted through means such as a long-distance communication satellite or submarine cable 100 and is supplied to a four-wire input terminal 101 after being demodulated by suitable demodulator means forming part of the terminal equipment (not shown). The demodulated signal is then led to a two-wire line terminal 106 through a variable attenuator 181, a two-wire output terminal 102, and a hybrid circuit 105, and then sent to a called subscriber set 108 through transmission lines and telephone exchanges designated by the dotted line 107.

In the reverse direction the called subscriber's replying signal (i.e. voice message) is transmitted to the calling subscriber through the lines and exchanges 107, terminal 106, the hybrid circuit 105, a two-wire input terminal 103, a switching means 182 which is normally in the closed state, a four-wire output terminal 104, and the long distance network 100. If the impedance balance at the hybrid circuit 105 is perfect, the calling subscriber's signal supplied at the input terminal 101 can be effectively transmitted to the called subscriber set 108 without any echo. As aforesaid, however, since the impedance unbalance at the hybrid circuit 105 is inherent, a portion of the incoming calling subscriber's signal appears on the two-wire input terminal 103 through the hybrid circuit 105, and is transmitted to the calling subscriber through the four-wire output terminal 104 and the long distance network 100, to be recognized as talker's echo.

To prevent this, the echo suppressor of the invention comprises, in addition to the four-wire terminals 101 and 104 and two-wire terminals 102 and 103: a pulse source 110 for generating timing pulses having a preset repetition period T approximately equal to the delay time in the echo path from the terminal 102 to the terminal 103; the variable attenuator 181 connected to the four-wire terminal 101 for selectively inserting in response to a control signal a prefixed value of attenuation between the four-wire input terminal 101 and the two-wire output terminal 102; terminals 109 for receiving the timing pulses; first and second maximum value extraction circuits 111 and 112 connected respectively to the two-wire output and input terminals 102 and 103 and the terminal 110 for generating maximum values of the calling and called subscriber's signals falling in the period beginning with each one of the timing pulses; an echo path attenuation factor measuring circuit 120 supplied with the output signals from the maximum value extraction circuits 111 and 112 for generating an attenuation-factor-representing signal in the echo path lying between the terminal 102 and the terminal 103 (the attenuation factor being the ratio of the signal level at the terminal 103 to that of the terminal 102) and for providing a delayed and an undelayed incoming signal level; a leakage level estimation circuit 130 for generating an estimated-leakage-level-representing signal by multiplying the echo path attenuation factor by the larger one of the delayed and undelayed incoming signal level; a called subscriber's signal detector 150 connected to the two-wire input terminal 103 and supplied with the estimated-leakage-level-representing signal for generating an output indicating the presence of the called subscriber's signal at the terminal 103; a first hangover circuit 70 connected to the called subscriber's signal detector 150 for allowing the output from the circuit 150 to pass therethrough and for holding it for a prefixed period (for example, 300 milliseconds) so as to generate the output from the called subscriber's signal detector 150 as the control signal; a calling subscriber's signal detector 140 connected to the two-wire output terminal 102 for generating an output indicating the presence of the called subscriber's signal at the terminal 102; a second hangover circuit 160 connected to the calling subscriber's signal detector 140 for allowing the output from the circuit 140 to pass therethrough and for holding it for another prefixed period (for example, 50 milliseconds) so as to transfer the output from the calling subscriber's signal detector 140 as a switch-open signal; an inhibitor 180 supplied with the control signal from the first hangover circuit 70 at an inhibit input terminal 180a and the switch-open signal from the second hangover circuit 160 at another input terminal for generating a switch-deriving signal upon reception of the switch-open signal exclusively in the presence of the control signal; and a switching means 182 interposed between the terminals 103 and 104 for disconnecting the outgoing signal circuit in response to the switch-deriving signal so as to suppress the leakage component.

The echo path attenuation factor measuring circuit 120 is comprised of: a first register 121 connected to the first maximum value extraction circuit 111 and to the terminal 109 for storing the output from the circuit 111 in response to the timing pulses, thereby to generate a signal representative of the calling subscriber's signal level with a delay of the repetition period T of the timing pulses; a second register 122 connected to the second maximum value extraction circuit 112 and the terminal 109 for storing the output from the circuit 112 in response to the timing pulses thereby to generate a signal representative of the called subscriber's signal level with a delay of the repetition period T of the timing pulses as an output thereof; a first selector 123 for selectively passing therethrough the larger signal as between the output of the first maximum value extraction circuit 112 and that of the second register 122, thereby to generate a signal as an output representing the outgoing signal level at the terminal 103 in the time period twice as large as the repetion period (2T) of the timing pulses; a division circuit 124 wherein the output from the selector 123 is divided by the output from the first register 121 for generating the echo-path-attenuation-factor-representing signal whose maximum value is unity and whose minimum is zero; and a third register 125 coupled to the division circuit 124 and the terminal 109 for holding the output of the division circuit 124 for the repetition period T of the timing pulses to the echo-path-attenuation-factor-representing signal from the division circuit 124, so as to facilitate the detection of the initial portion of the called subscriber's signal.

The leakage level estimation circuit 130 is comprised of; a second selector 131 for selectively passing therethrough the larger one as between the output from the first maximum value extraction circuit 111 and the output from the first register 121, thereby to generate a signal representative of the incoming signal level at the terminal 102 in the time period corresponding to the output of the first selector 123; and a multiplier 132 wherein the echo-path-attenuation-factor-representing signal from the register 125 is multiplied with the output from the third selector 131, thereby to generate the estimated leakage level supplied to the called subscriber's signal detector 150.

Referring to the FIG. 2 showing waveforms observed at various points in the embodiment, the operation of the embodiment will be described hereunder.

Under the state where the calling subscriber's signal is present at the terminal 101 and the called subscriber's signal is not present at the terminal 103, the control signal is not provided to the variable attenuator 181 (to be described later) so that the variable attenuator 181 acts as a signal path without any attenuation, whereby the calling subscriber's signal received at the terminal 101 appears at the terminal 102 as it is. Under this state, the calling subscriber's signal having a signal level shown in FIG. 2, waveform diagram (B) in a solid line Fo appearing at the terminal 102 is converted by the maximum value extraction circuit 111 and the first register 121 to the level representing signal being a locus of the maximum values extracted during each of the first time windows of the interval T (the repetition period of the timing pulses as shown in FIG. 2, waveform diagram (A), and then is applied to the division circuit 124 as the divisor data. The first time windows (designated by codes $I_1, I_2, \ldots, I_n, \ldots$) are in synchronism with the timing pulses. The leakage (echo) component appearing at the terminal 103, whose level is shown in FIG. 2, waveform diagram (C) in a solid line G, is processed in a manner similar to the incoming signal by the second maximum extracting circuit 112 and the second register 122, and then applied to the first selector 123, whereby the larger one of the two leakage-level-representing signals is selectively supplied to the division circuit 124 as the dividend data. The output from the selector 123 represents therefore a locus of maximum values sampled during each of the second time windows of the interval 2T (twice as large as the repetition period of the timing pulses). The second time windows are in synchronism with the alternate timing pulses, and are designated $J_1, J_2, \ldots, J_n, \ldots$ as shown in FIG. 2, waveform diagram (C), each corresponding to the first time window $I_1, I_2, I_3 \ldots, I_n, \ldots$. Inasmuch as the time interval T is selected approximately equal to the delay time in the echo path as stated above, a part of the calling subscriber's signal present in one of the first time windows (for instance $I_1$) unavoidably appears as a leakage component in the corresponding second time window (in this case, $J_1$). Thus, the division circuit 124 generates a substantially real echo-path-attenuation-factor-representing signal which is then given the delay T (the repetition period of the timing pulses) through the register 125 which output is shown in FIG. 2, waveform diagram (D). The echo-path-attenuation-factor-representing signal tends to indicate a higher value under the effect of the difference of the intervals in the first and second time windows, especially at the initial part and trailing part of the calling subscriber's signal. The detection of the called subscriber's signal, however, is not substantially affected by the above-mentioned tendency because the called subscriber's signal rarely begins in these leading or trailing parts of the calling subscriber's signal and the highest attenuation factor is limited to unity, insuring at least the detection capability of the conventional echo suppressor associated with the hybrid having the poorest attenuation factor. When both the calling and the called subscriber's signal levels are zero, the attenuation factor is also set to unity.

The second selector 131 operates in a similar manner to the first selector 123, providing the called subscriber's signal is as shown by $F_1$ in FIG. 2, waveform diagram (C). The called subscriber's signal is sent to the multiplier 132. The echo-path-attenuation-factor-representing signal from the third register 125 is applied to the multiplier 132, where the level of the called subscriber's signal is multiplied by the echo path attenuation factor, so as to generate the estimated-leakage-level-representing signal as shown by E in FIG. 2, waveform diagram (C).

Now the estimated leakage level is supplied to the called subscriber's detector 150, where the called subscriber's signal level is compared therewith. Under this state, the detector 150 does not provide any output signal because there is no called subscriber's signal. As a result, no control signal is supplied from the first hangover circuit 70 to short-circuit the variable attenuator 181.

On the other hand, the calling subscriber's signal is detected by the detector 140, and the output therefrom is supplied as a switch open signal to one of the input terminals of the inhibition gate circuit 180 through the second hangover circuit 160. Since there is no control signal at the inhibit input terminal 180a under this state, the switchopen signal is applied to the switching means 182 through the inhibitor 180. The switching means 182 is opened accordingly, so that the leakage component appearing at the terminal 103 is suppressed and prevented from being transmitted to the calling (remote end) subscriber as talker's echo. The hangover circuit 160 holds the output from the calling subscriber's signal detector 140 for a prefixed period od time, so as to prevent the chattering of the switching means 182.

Now the operation of the embodiment assuming the presence of the called (near end) subscriber's signal will be detailed hereunder. The called subscriber's signal at the terminal 103 is compared at detector 150 with the estimated leakage level supplied from the multiplier 132 as shown by curve E in FIG. 2, waveform diagram (C). Inasmuch as the estimated leakage level represents the closely estimated real leakage (echo) level in the period of the steady state of the calling subscriber's signal, the called subscriber's signal (H in FIG. 2, waveform diagram (C)) superimposed on the leakage level G is detected immediately at time point P. While the estimated-leakage-level-representing signal starts to increase after a preset delay time in accordance with the increase of the called subscriber's signal level, the initial part of the called subscriber's signal having relatively low level is quickly detected. The initial clipping is thus estimated (The initial clipping is inherently inevitable for a conventional echo suppressor wherein the called subscriber's signal is detected at the time point Q through comparison with the threshold level, as shown in curve K in FIG. 2, waveform diagram (C), which is set, to 6 dB (half in amplitude) below the calling subscriber's signal level F1. As shown, the initial clipping extends from time point P to Q.) The preset delay time for the estimated-leakage-level-representing signal is supplied to the third register 125, wherein the echo-path-attenuation-factor-representing signal from the division circuit 124 is stored in synchronism with the timing pulses and read out after one repetition period T. The output of the called subscriber's signal detector 150 is fed as the control signal to the inhibit input terminal 108a of the inhibitor 180 through the first hangover circuit 70, so that the switch-open signal from the second hangover circuit 160 is inhibited. Hence the switching means 182 is closed to complete the outgoing signal path for the called subscriber's signal. The control signal is also led to the variable attenuator 181, which gives a preset attenuation (for instance, 6 dB) to the incoming signal path. As the result the calling subscriber's signal is attenuated, and the reference level (the estimated leakage level) for the detection of the calling subscriber's signal is lowered accordingly. It will now be apparent that with the present circuit structure the initial clipping of the called subscriber's signal can be avoided even for a low-level voice signal.

Description will now be given referring to FIG. 3 which shows an embodiment of the maximum value extraction circuit 111 (identical to the circuit 112) employed in FIG. 1. At the comparator 303, an absolute value (obtained by just eliminating a sign bit) of the digitized voice signal supplied through the terminal 102 and the output of a register 306 are compared. Depending on the result of the comparison, a switch 304 is driven to select the larger signal in absolute value, and then stores the selected signal in the register 306. Accordingly, the register 306 stores maximum absolute values of the input signal falling in the period beginning with each one of the timing pulses supplied at the terminal 109 from the timing source 110 (see FIG. 1). The maximum value extraction circuit is described in detail in U.S. patent application Ser. No. 530,620 filed on Dec. 9, 1974 by the inventors of the present application. Therefore, any further description will not be given here.

Figure 4:
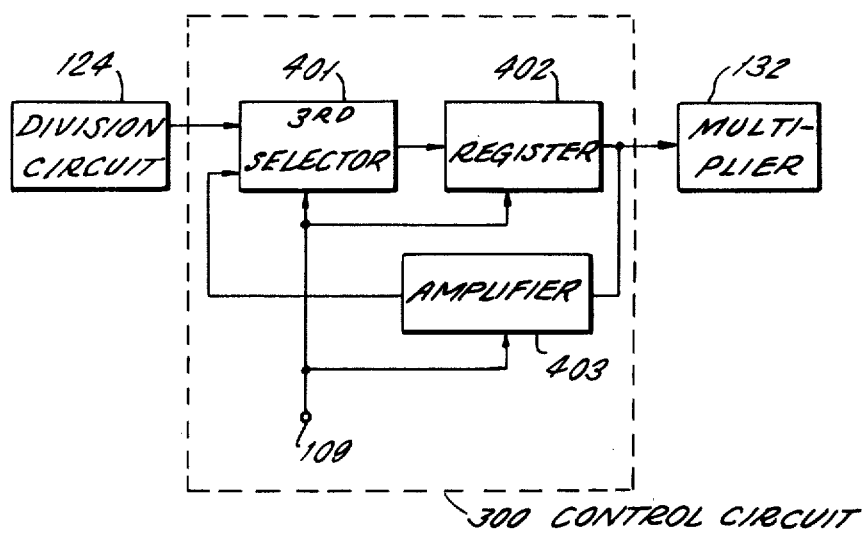
FIG. 4 is a block diagram showing a modification for a part of the embodiment shown in FIG. 1.

Reference is next made to FIG. 4 showing in block form a control circuit to be substituted for the third register 125. While the third register 125 serves as a delay means, it is not capable of preventing the increase of the echo-path-attenuation factor owing to the break-in of the called subscriber's signal or a pause of the calling subscriber's signal, resulting in the interruption of the calling subscribers signal. To prevent this interruption, the attenuation factor increasing rate control circuit 300 has a third selector 401, a fourth register 402, an amplifier 403 and a terminal 109, where the timing pulses are applied to enable a synchronous operation of the circuit. The output of the fourth register 402 is fed back to the third selector 401 through the amplifier 403 which has a fixed amplification factor. The third selector 401 selectively passes therethrough to the fourth register 402 the smaller one of the output from the division circuit 124 and the output from the amplifier 403. Thus, the echo-path-attenuation-factor-representing signal is prevented from increasing very quickly.

Figure 5:
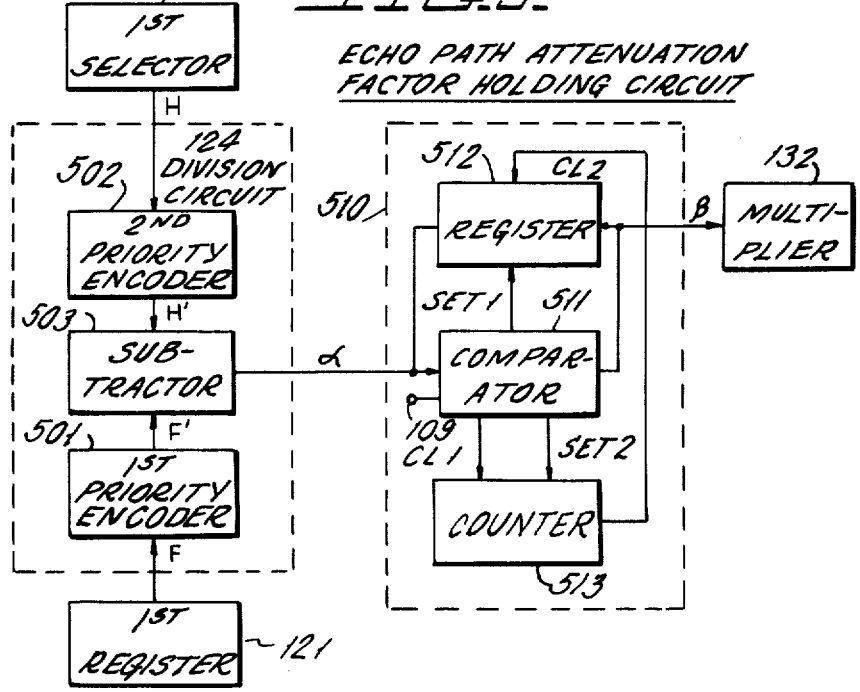
FIG. 5 is a detailed block diagram showing an embodiment of a part of the embodiment shown in FIG. 1.

Referring to FIG. 5, further details of the division circuit 124 and an echo path attenuation factor holding circuit 510 coupled thereto are shown in block form. The calling subscriber's signal level F from the first register 121 is applied to the first priority encoder 501, which converts the level F to a signal F' (integer) representing the exponent part of the logarithm of F to the base 2. In other words, the priority encoder 501 generates the highest place of a 1 's bit of binary — expressed input signal, and it can be purchased in the commercial market. In like manner, another second priority encoder 502 converts the called-subscriber's-signal-level-representing signal H to a signal H' (integer) representing the exponent part of the logarithm of H to the base 2. The subtractor 230 executes the subraction of H' from F' to generate the difference thereof. The difference represents the ratio of the called subscriber's signal level to the calling subscriber's signal level, because the F' and H' both indicates the logarithm of the F and H to the common base 2 respectively.

The signal representative of $\alpha$ is applied to the echo path attenuation factor holding circuit 510 which prevents the same from decreasing towards zero quickly, eliminating the chattering of the switch means 182.

For this purpose, the comparator 511 compares the $\alpha$- representing signal with the output from a register 512. When the result of the comparison shows that the $\alpha$-representing signal is larger than the output from the register 512, the comparator 511 supplies a signal SET 1 to the register 512 where the $\alpha$-representing signal is stored in synchronism therewith, and also supplies a signal CL1 to a counter 513 which is cleared thereby. When the $\alpha$-representing signal is smaller than the output of the register 512, the signals SET 1 and CL1 are not generated to hold the contents of the register 512. Instead, a signal SET 2 is supplied to the counter 513 which counts up occurrences of the signal SET 2 by unity. When the counted number of the counter 513 reaches a preset number, it clears itself and generates a siganl CL2 which clears the register 512.

Since the comparison is synchronized with the timing pulses applied at a terminal 109, the preset number corresponds to a certain time period defined by an integral multiple of a unit time interval T of the timing pulses. Therefore, the echo-path-attenuation-factor-representing signal obtained at the output of the register 512 is held for the certain time period and prevented from decreasing quickly to eliminate the chattering.

In the description heretofore, the calling and called subscriber's signals are assumed to be digitized signals. Therefore, to adapt the embodiment shown in FIG. 1 to the anologue type communication network, two conventional anologue-to-digital converters are needed. One of the converters may be disposed between the terminal 102 and the first maximum value extraction circuit 111 and the detector 140, and the other between the terminal 103 and the second maximum value extraction circuit 112 and the detector 140.

Although electro-magnetic switches have been shown in FIGS. 1 and 3 as the switching means 182 and 304, any other types of switches may be substituted therefore such as, for example, electronic switches.

While the invention has been described in connection with the specific embodiment, it is to be clearly understood that this description is made by way of example and not as a limitation to the scope of the invention as set forth in the accompanying claims for patent.

What is claimed is:

1. An echo suppressor for use in a communications network coupling a calling subscriber to a called subscriber comprising a four-wire circuit having an input path for incoming signals from the calling subscriber and an output path for outgoing signals from the called to the calling subscriber, a two-wire circuit coupled to the called subscriber; hybrid means coupled between said two-wire circuit and said four-wire circuit to provide impedance balance between said circuits; the improvement comprising:
   first means coupled to input and output paths for generating a first signal representative of the ratio of the level of the incoming signal to that of the outgoing signal both of said levels being obtained over periods of time which are mutually different but are at least partly overlapping;
   second means coupled to said first means for generating a second signal representative of the product of said first signal and the level of the incoming signal obtained at a point in time after the first signal is generated;
   third means coupled to said output path and said second means for detecting the called subscriber's signal by comparing the outgoing signal level with the level of said second signal;
   fourth means coupled to said input path for detecting the calling subscriber's signal to generate an output;
   fifth means coupled to said third and fourth means for generating a third signal only during the presence of the output of said fourth means and the absence of the output of said third means; and
   sixth means disposed in said output path and responsive to the output of the fifth means for disconnecting the output path to prevent an outgoing signal from being transmitted to the four-wire circuit during the presence of said third signal.

2. The echo suppressor as claimed in claim 1, wherein the incoming and outgoing signals are digitized signals and wherein means are provided at a stage prior to said first means for detecting the maximum values represented by the digital codes of said signals, said maximum values being sampled at intervals mutually different but at least partly overlapping.

3. An echo suppressor for use in a communications network coupling a calling subscriber to a called subscriber comprising a four-wire circuit having an input path for coupling incoming signals from the calling subscriber to a called subscriber and an output path for coupling outgoing signals from the called to the calling subscriber; a two-wire circuit coupled to the called subscriber; hybrid means coupled between said two-wire circuit and said four-wire circuit to provide impedance balance between said circuits; the improvement comprising;
   a timing pulse source for generating timing pulses of a constant repetition rate;
   an incoming signal level extraction circuit coupled to said input path and said timing pulse source for generating an incoming-signal-level-representing signal sampled in a period falling in two successive ones of said timing pulses;
   an outgoing signal level extraction circuit coupled to said output path and said timing source for generating an outgoing-signal-level-representing signal sampled in the period falling in
   two successive ones of said timing pulses;
   a first register for storing said incoming-signal-level-representing signal;
   a second register for storing said outgoing-signal-level-representing;
   a first selector for selectively passing therethrough the larger one of the outgoing-signal-level representing signal and the output of said second register;
   a division circuit to generate a signal representative of the ratio of the output level of said first selector to the output level of said first register;
   a second selector for selectively passing therethrough the larger one of the output level of said incoming signal level extraction circuit and the output level of said first register;
   a mulliplier coupled to said division circuit and said second selector for generating a signal representative of the product of said ratio and the output level of said second selector;
   a called subscriber's signal detector coupled to said output path and said multiplier to detect the called subscriber signal through the comparison with the output of said multiplier;
   a calling subscriber's signal detector coupled to said input path for detecting the calling subscriber signal;
   a switch driver circuit coupled to both said subscriber signal detectors for generating a driving signal; and
   a switching means disposed in said output path and responsive to said driving signal for disconnecting the output path from said four-wire circuit, 4. The echo suppressor of claim 3 wherein a hangover circuit is disposed in at least one of the circuits coupling said called subscriber's signal detector and said switching means driving circuit and the circuit coupling said calling subscriber's signal detector and said switch driver circuit, said hangover circuit holding the output from said detector for a prefixed period of time.

5. The echo suppressor of claim 4 wherein a variable attenuator is disposed in said input path to which said incoming signal extraction circuit and said calling signal detector are coupled, said attenuator being responsive to the output signal of said called subscriber's signal detector, so that a prefixed attenuation is inserted in said input path in the presence of said signal and so that no attenuation is given in its absence.

6. The echo suppressor of claim 5 wherein a holding circuit is disposed between said division circuit and said multiplier, said holding circuit comprising; a third register having an output coupled to said multiplier, an amplifier accepting the output signal of said third register to amplify the signal by a prefixed rate, a third selector for passing the smaller one of the output of said division circuit and the output of said amplifier and a terminal to accept said timing pulses so as to synchronize operations of the amplifying and selecting circuits.

7. The echo suppressor of claim 5 wherein said division circuit comprises; a first and second priority encoders, each of said encoders converting the output signal of said first register and said first selector respectively to a signal representative exponent part of the logarithm of said output signal to the base 2, a subtractor for subtracting the output of said second priority encoder from the output of said first priority encoder, the output of said subractor being coupled to said multiplier.

8. The echo suppressor of claim 7 wherein a means is disposed between said subtractor and said multiplier for preventing the quick decrease of the output from said subtractor, said preventing means comprising: a fourth register coupled in its output to said subtractor; a comparator for comparing said output of said subtractor with the output of said fourth register to generate a first set signal applied to said register so as to store the output from said subtractor to said fourth register and to generate a first clear signal when said output from said subtractor is larger, and to generate a second set signal when said subtractor output is smaller; a counter for counting up said second set signal to generate a second clear signal applied to said fourth register thereby to clear said fourth register and said counter itself, when the counted number of said counter reaches a preset value.

9. The echo suppressor of claim 5 wherein a holding means is disposed between said division circuit and said multiplier for holding the output signal of said division circuit for a predetermined period of time.

10. The echo suppressor of claim 4 wherein the output of said division circuit represents the value of the output level of said first selector divided by the output level of said first register and is limited between zero and unity.

11. An echo suppressor for use in a communications network coupling a calling subscriber to a called subscriber comprising a four-wire circuit having an input path for incoming signals from the calling subscriber and an output path for outgoing signals from the called to the calling subscriber, a two-wire circuit coupled to the called subscriber; hybrid means coupled between said two-wire circuit and said four-wire circuit to provide impedance balance between said circuits; the improvement comprising;
  first means coupled to said input and output paths for generating a first signal representing the ratio of the signal values in said paths, said values being obtained over periods of time which are mutually different but are at least partially overlapping;
  second means coupled to said input path and said first means for generating a product signal representing the product of the first signal and the signal in the incoming path and obtained at a point in time after the first signal is generated;
  third means coupled to said second means and said output path for generating a control output when the signal in the output path is greater than said product signal;
  fourth means for disconnecting said output path when said control output is absent.

12. The apparatus of claim 11 further comprising attenuation means connected in said input path and responsive to the presence of said control output to attenuate signals received in said input path.

13. The apparatus of claim 11 comprising delay means coupled between said fourth means and said third means to delay coupling of said control output to said fourth means.

14. The apparatus of claim 11 further comprising detector means coupled to said input path for enabling said fourth means to disconnect the output path when a voice signal is present in the input path.

15. The apparatus of claim 14 further comprising delay means coupled between said detector means and said fourth means for delaying the operation of said fourth means.

* * * * *